United States Patent
Chen

[11] Patent Number: 5,482,062
[45] Date of Patent: *Jan. 9, 1996

[54] APPARATUS AND METHOD FOR AUTOMATIC TRANSMISSION SYSTEM FLUID EXCHANGE AND INTERNAL SYSTEM FLUSHING

[76] Inventor: We-Yu Chen, 3708 Avalon Blvd., Los Angeles, Calif. 90011

[21] Appl. No.: 253,968

[22] Filed: Jun. 3, 1994

[*] Notice: The term of this patent shall not extend beyond the expiration date of Pat. No. 5,337,708.

Related U.S. Application Data

[63] Continuation-in-part of Ser. No. 76,996, Jun. 15, 1993, Pat. No. 5,337,708.

[51] Int. Cl.⁶ .................................................. B08B 9/02
[52] U.S. Cl. .................. 134/56 R; 134/95.1; 134/104.2; 134/169 R; 134/169 A
[58] Field of Search ................... 134/56 R, 95.1, 134/104.2, 166 R, 169 R, 169 A; 123/198 A

[56] References Cited

U.S. PATENT DOCUMENTS

| | | |
|---|---|---|
| 2,187,413 | 1/1940 | Boezi et al. .......................... 134/169 A |
| 2,222,516 | 11/1940 | Powell et al. . |
| 3,513,941 | 5/1970 | Becnel . |
| 3,528,854 | 9/1970 | Rutherford . |
| 4,109,703 | 8/1978 | Babish et al. . |
| 4,127,160 | 11/1978 | Joffe . |
| 4,176,708 | 12/1979 | Joffe ..................................... 134/169 A |
| 4,197,140 | 4/1980 | Swan . |
| 4,520,773 | 6/1985 | Koslow . |
| 4,606,311 | 8/1986 | Reyes et al. . |
| 4,606,363 | 8/1986 | Scales .................................. 134/169 A |
| 4,671,230 | 6/1987 | Turnipseed . |
| 4,787,348 | 11/1988 | Taylor . |
| 4,877,043 | 10/1989 | Carmichael . |
| 4,977,872 | 12/1990 | Hartopp . |
| 4,989,561 | 2/1991 | Hein et al. . |
| 5,063,896 | 11/1991 | Hyatt et al. . |
| 5,097,806 | 3/1992 | Vataru et al. . |
| 5,257,604 | 11/1993 | Vataru et al. ........................ 123/198 A |
| 5,287,834 | 2/1994 | Flynn .................................. 134/169 A |
| 5,289,837 | 3/1994 | Betancourt .......................... 134/57 R |
| 5,381,810 | 1/1995 | Mosher ................................ 134/56 R |

FOREIGN PATENT DOCUMENTS 2202460A  9/1988  United Kingdom .

*Primary Examiner*—Frankie L. Stinson
*Attorney, Agent, or Firm*—Nilsson, Wurst & Green

[57] ABSTRACT

A method and an apparatus are provided for complete fluid exchange and internal system flushing of an automatic transmission system as the transmission system operates. The apparatus is connectable to the transmission system and, in a preferred embodiment, is operable at an adjustable output fluid flow rate and pressure setting to act as an independent fluid supply and storage system for the automatic transmission system in the course of a fluid exchange and flushing operation. In addition to its application to an automatic transmission system, the apparatus of the present invention can be used to flush the fuel system of any internal combustion engine.

11 Claims, 8 Drawing Sheets

5,482,062

APPARATUS AND METHOD FOR AUTOMATIC TRANSMISSION SYSTEM FLUID EXCHANGE AND INTERNAL SYSTEM FLUSHING

This application is a continuation-in-part of application Ser. No. 08/076,996 filed Jun. 15, 1993 now U.S. Pat. No. 5,337,708.

FIELD OF THE INVENTION

This invention relates generally to an apparatus and a process for replacing used automatic transmission fluid and for cleaning the internal surfaces of an automatic transmission system without disassembly. In addition, some embodiments of the present invention are directed to flushing the fuel system of an internal combustion engine, including components such as fuel supply lines, injection pumps, intake apparatus, fuel pressure regulators, injectors, carburetors, and fuel return lines.

BACKGROUND OF THE INVENTION

In automatic transmission systems of motor vehicles and similar machines, transmission fluid is stored, delivered, transferred or processed through rigid enclosed passages, chambers, orifices, mechanisms, or pumping/metering devices, all of which require regular internal cleaning to ensure proper service and system life. Such cleaning also enhances cost effective operation because fluid contaminants, deposits of additives or by-products of the automatic power transmission process, can foul and cause premature wear to system components, or otherwise inhibit the performance and delivery characteristics of the system.

If contaminants, such as dirt, oil sludge, gum, varnish, burned oil, deposits of worn out parts, residues of transmission additives, etc., are not properly flushed out of the automatic transmission system, they are likely to cause:
Slow and hesitant acceleration
Rough, skipping, slow, erratic shifting, incorrect shifting points, excessive creep and abnormal vibration while shifting gears automatically
Gear position slippage or lock-up
Premature transmission fluid burn-out causing excessive fluid consumption and overheating
Premature transmission component wear causing rapid deterioration of system performance, as well as other symptoms.

If the above problems are not resolved in a timely manner, an expensive transmission overhaul is likely to be required.

The industry is well aware of the problems and difficulties encountered in servicing automatic transmission systems. The most common method for avoiding these problems is to change transmission fluid periodically. However, due to the design of most current automatic transmission systems, a typical fluid change replaces only from about 25% to slightly more than 55% of the used fluid.

The traditional method of changing automatic transmission fluid is to remove the dirty fluid in the pan by manually opening the pan or by withdrawing the fluid using a suction tube inserted through the dipstick tube, followed by filling the pan with fresh transmission fluid. When the pan is removed, it is also necessary to replace the gaskets, replace the filter and reinstall the pan. These servicing methods leave about 45% to 75% of the contaminated or burned fluid inside the cavities and components of the transmission system. For example, the torque converter, valve body, clutch chambers, passages, etc., all retain a large amount of used automatic transmission fluid, even after such a fluid change.

To replace all of the used transmission fluid, the only other option has heretofore been a complete automatic transmission system overhaul. However, this drastic and costly method is obviously not preferred for normal transmission service.

Other proposed solutions to automatic transmission system servicing problems are in common practice today. These include the use of aftermarket transmission fluid additives between fluid changes. Such additives generally improve the physical or chemical properties of the transmission fluid. For example, they can increase viscosity, improve heat transfer characteristics, and inhibit oxidation of internal components.

Also practiced is the addition of an aftermarket transmission system detergent solvent just before each fluid change. The mixture of detergent solvent and used transmission fluid circulates within the system to dissolve and dislodge contaminants while the transmission system operates under normal conditions, i.e. with the engine turned on. After this "cleaning operation" is completed, the traditional draining method is applied to remove the mixture of used transmission fluid and detergent solvent. However, as mentioned before, only 25% to 55% of the fluid mixture is actually removed in this way.

From the above discussion, we have concluded that traditional methods of changing fluid in automatic transmission systems leave considerable amounts of used transmission fluid behind. Since it is almost impossible to replace all of the used transmission fluid without disassembling the transmission system, regular flushing of automatic transmissions is seldom carried out. Therefore, vehicle and equipment owners have not been able to obtain a completely clean automatic transmission system. In fact, traditional methods of servicing automatic transmission systems only prolongs the inevitable—failure of the automatic transmission system due to contamination of the transmission fluid. In the absence of an improved alternative service method, deterioration and early failure of automatic transmissions is expected and tolerated. If a vehicle owner tries to rectify the situation by adding aftermarket additives or using detergent solvent, damage is likely to be even more severe in the long run. In addition to the large amount of used fluid left in the transmission, detergent solvents or expired additives remain inside the automatic transmission system. These solvents or additives are generally not beneficial if allowed to remain in the automatic transmission system. They can lead to unpredictable results and side effects on various system components. Moreover, if different additives or detergent solvents are used, unwanted chemical reactions can occur between them.

In view of the foregoing, there has long been a need for a simple, effective, and inexpensive method and system capable of removing all of the used automatic transmission fluid and embedded contaminants from the internal passages and chambers of an automatic transmission system without complete disassembly of the system.

The fuel systems of internal combustion engines, where fuel is stored, delivered, transferred or processed through rigid enclosed passages, chambers, orifices, mechanisms, or pumping/metering devices, also require regular internal cleaning to ensure proper service and system life and to assure cost effective operation. If cleaning is not performed, fuel contaminants, deposits of additives, or by-products of the combustion process can foul and cause premature wear to system components, or otherwise inhibit the performance and delivery characteristics of the system.

Moreover, the significance of flushing the fuel system of the internal combustion engine without disassembly of the fuel system is well known, as discussed in the following U.S. patents:

U.S. Pat. No. 4,197,140 to Swan
U.S. Pat. No. 4,520,773 to Koslow
U.S. Pat. No. 4,606,311 to Reyes et al.
U.S. Pat. No. 4,671,230 to Turnipseed
U.S. Pat. No. 4,787,348 to Taylor
U.S. Pat. No. 4,877,043 to Carmichael
U.S. Pat. No. 4,989,561 to Hein et al.
U.S. Pat. No. 5,097,806 to Vataru et al.

Therefore, in addition to the current need for an automatic transmission cleaning and draining apparatus, it is also desirable to provide the additional benefits of flushing the fuel system of an internal combustion engine without troublesome field modification.

The following patents relate to systems for the cleaning and/or diagnosis of automotive fluid systems:

U.S. Pat. No. 4,127,160 to Joffe
U.S. Pat. No. 4,520,773 to Koslow
U.S. Pat. No. 4,606,311 to Reyes et al.
U.S. Pat. No. 4,787,348 to Taylor
U.S. Pat. No. 4,877,043 to Carmichael
U.S. Pat. No. 4,989,561 to Hein et al.
U.S. Pat. No. 5,097,806 to Vataru et al.

Joffe teaches a method and an apparatus for flushing debris from a liquid circulation system, such as the cooling system of a water-cooled vehicle. This teaching is primarily applied to a vehicle cooling system and would not work on either an automatic transmission system or a fuel system of an internal combustion engine. Even in the context of flushing cooling systems, however, the method and apparatus of the Joffe patent do not permit complete fluid exchange because of the thermostat built into the cooling system between a radiator and its associated engine block. Because the apparatus is designed for use when an engine is not operating, it is assumed that the thermostat will be in a closed position, blocking all coolant flow in that important branch of the cooling system. In order to overcome the disadvantages associated with a partially blocked cooling system, the Joffe patent requires three separate connections to the cooling system and a complicated series of flushing steps. Even then, complete exchange of coolant is not achieved.

Koslow teaches a method and an apparatus for cleaning and testing the fuel injection system of a vehicle without disassembling the fuel injectors. The apparatus includes a device for feeding a solvent-fuel mixture, a control system and a series of connectors. The method includes a testing procedure which does not require disassembling the injectors. A critical step is running the apparatus to measure the flow through the fuel injection valve via a flow meter.

Reyes et al. teaches a method and an apparatus for cleaning the fuel injection system of a vehicle without disassembly and includes a device for feeding a solvent-fuel mixture into the supply system of the engine, and a control system for cleaning the injectors while running the engine.

Taylor describes a method and an apparatus for cleaning the internal body of a diesel engine, such as its internal components, injection pump, fuel injectors, fuel lines and so on. This teaching is primarily for carbon deposits and includes a fuel supply system, a chemical tank, filter means and other components.

Carmichael describes an apparatus on a cart with wheels to transport the apparatus to an engine to be serviced. The apparatus contains means for delivering a cleaning solution under pressure to the engine. However, it is suitable only for cleansing the fuel system of an internal combustion engine.

Hein et al. describes a method and an apparatus for cleaning the intake system of an internal combustion engine. Means are provided for injecting solvent directly into the engine intake system and varying the duty cycle or timing of the injections, thereby controlling the solvent flow. A pumping unit and a solvent holding tank are included. In operation, normal fuel flow to the engine is disconnected and the engine runs solely on the combustion of the solvent introduced by the injector through the air metering block of the apparatus. Because of this mode of operation, the apparatus is suitable for cleaning only the air intake system, intake valves and combustion chamber. Other parts of the engine, such as the fuel delivery system, cannot be cleaned.

Vataru et al. describes a method of cleaning internal combustion engine fuel injector structures, valves and combustion chambers by employing a canister containing a prescribed mixture of engine fuel and cleaning solvent. The mixture is discharged into the engine components using high pressure gas to charge the canister. However, the described method is limited to automotive fuel injection system use and does not include any diagnostics of the system being cleaned.

SUMMARY OF THE INVENTION

This invention involves a method of quick but effective flushing and replacement of all used transmission fluid of the automatic transmission system of a motor vehicle or similar machine. In an automatic transmission system comprising a transmission and a separate or external transmission cooler device interconnected in a closed circuit by a fluid transfer conduit, the current method of flushing the system includes the steps of interconnecting an independent fluid supply and storage apparatus in series with the external fluid transfer conduit, and after establishing stable flow conditions, shifting through all gear positions, and then directing fresh transmission fluid into the system, and finally, while replacing used transmission fluid and flushing solution, adjusting the output pressure and flow rate of the fresh transmission fluid.

The apparatus for complete removal of used transmission fluid and effective flushing as described by the present invention comprises a control means for controlling operation of the equipment and a machine module.

The machine module provides the functions of pumping and regulating the output pressure and the flow rate of the fluid, as well as other functions such as filtration to remove contaminants from the automatic transmission system, supplying fresh transmission fluid, and receiving the used transmission fluid and flushing solution mixture. It also provides diagnostic signals, such as fluid pressure, fluid flow rate, visible condition of the fluid, and the condition and identification of contaminants in the fluid during the flushing mode, to assist in determining the operating condition of the transmission system. Furthermore, in certain specific embodiments, the unique design of the apparatus permits it to be used to perform fuel system flushing and diagnostics.

Accordingly, an objective of the present invention is to provide a method and an apparatus for complete removal of used transmission fluid without the need to fully disassemble the automatic transmission system.

A more particular objective is to provide a method and an apparatus for rapidly and effectively flushing the automatic transmission system of motor vehicles or similar machines having automatic transmission systems, at routine intervals, for incorporation in the normal service operation and schedule.

Another object of the invention is to provide a system diagnostic means whereby diagnostic functions can be carried out to determine the operating conditions of the automatic transmission system before, during, and after application of the cleaning mode of the present invention.

Another important object of the present invention is to provide an apparatus which is flexible in its use, so that in addition to its application to the automatic transmission system, it can also be used to flush the fuel system of any internal combustion engine without field modification.

Another object of the invention is to provide a system diagnostic means whereby diagnostic functions can be carried out to determine the operating conditions of the fuel system of the internal combustion engine before, during, and after application of the cleaning mode of the invention.

A further object of the present invention is to provide an apparatus that is completely portable and operates on a 12-volt DC electrical system which can be powered by the vehicle's battery.

A still further object of the present invention is to provide an apparatus that is relatively inexpensive to manufacture, and is simple and rugged in construction.

Further objects and advantages of the present invention will become apparent from the following portions of the specification, claims, and attached drawings.

The foregoing and other objects are achieved, in one embodiment of the invention, by providing an apparatus for internally flushing and exchanging the fluid within an automatic transmission system while the automatic transmission system operates, including: a storage tank for holding fluid to treat the automatic transmission system; a transfer conduit connected to a pump for delivering fluid to the automatic transmission system; a supply conduit leading from the pump to an outlet port, the outlet port adapted to be connected to a conduit which leads to the automatic transmission; and a return conduit leading from an inlet port to a waste conduit, the inlet port adapted to be connected to a conduit leading from the automatic transmission system and the waste conduit leading to a location for disposal of waste fluid passing from the automatic transmission while it operates. In a further embodiment, the apparatus includes a flow regulating apparatus in the return conduit or the waste conduit, and the flow regulating apparatus may include at least one flow regulating valve. In another embodiment, the apparatus also services the fuel system of an automobile, the system then being provided with a valve apparatus for selectively directing flow from the return port to the storage tank itself.

A corresponding method for internally flushing and exchanging the used fluids within an automatic transmission system includes the steps of: providing a storage tank containing new fluid for replacing the used fluid in the automatic transmission system; pumping new fluid from the storage tank to the automatic transmission system as the automatic transmission system operates, the new fluid passing through a supply conduit and a conduit leading to the automatic transmission system; and receiving used fluid from the automatic transmission system along a return conduit as the automatic transmission system operates. In a further embodiment, the method may include the steps of selectively passing the used fluid from the return conduit to a waste conduit for disposal, or regulating the flow of used fluid in either the return conduit or the waste conduit. In a further embodiment, the method includes: providing a bypass conduit connected between a first valve apparatus located in the supply conduit and a second valve apparatus located in the return conduit; selectively directing flow to the automatic transmission system from one of the bypass conduit and the pump using the first valve apparatus; and selectively directing flow from the automatic transmission system to one of the bypass conduit and the waste conduit using the second valve apparatus.

In yet another embodiment, a fluid exchange and internal flushing apparatus for an automatic transmission system and a fuel system includes: a first storage tank for holding a first fluid to treat an automatic transmission system; a second tank for holding a second fluid to treat a fuel system; a transfer conduit connected at one end to a pump and connectable alternately at another end to the first and second storage tanks for delivering fluids to the system; a supply conduit leading from the pump to an outlet port, the outlet port adapted to be connected to a conduit which leads to the systems; a return conduit connected to the second storage tank and to a first inlet port, the return conduit adapted to be connected to a conduit extending from a fuel system; a waste conduit extending from a second inlet port to a waste location for disposal of waste fluid passing from the automatic transmission system, the waste conduit adapted to be connected to a conduit extending from an automatic transmission system; and a bypass conduit connected between either the supply conduit or the outlet port at one end, a valve apparatus located in the waste conduit at another end, the valve apparatus for selectively directing flow from the second inlet port to one of the bypass conduit and the waste location. In a variation on this embodiment, the functions of the first and second inlet ports are served by a single inlet port.

DESCRIPTION OF THE PREFERRED EMBODIMENTS

Figure 1:
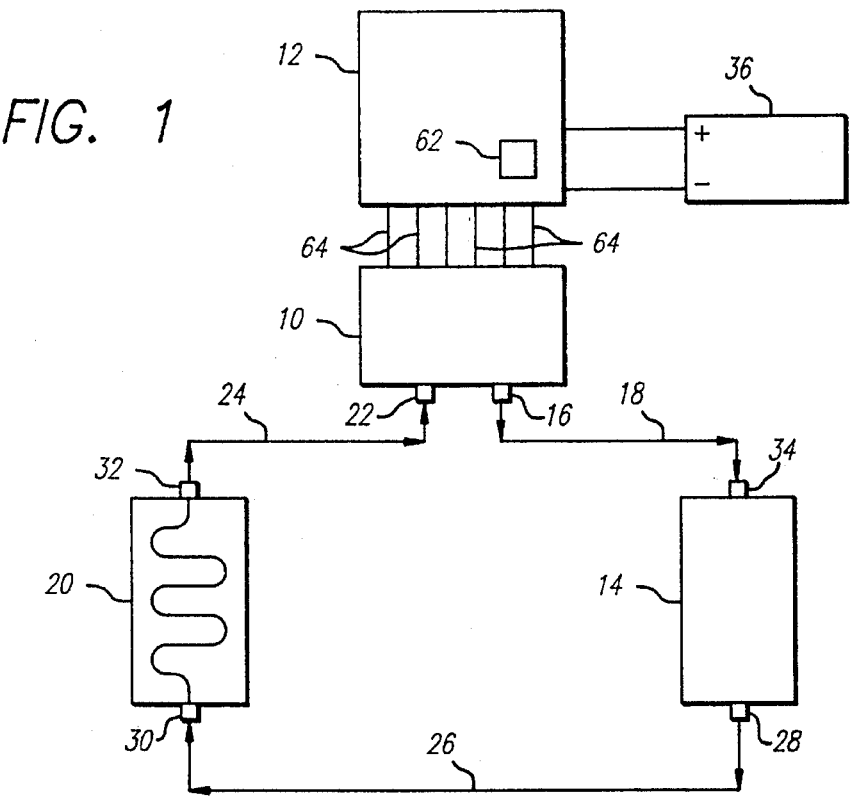
FIG. 1 is a block diagram of a system constructed according to the present invention, particularly illustrating a preferred method of connecting its major components.

Referring particularly to the drawings, there is shown in FIG. 1 a preferred embodiment of the present invention for automatic transmission system fluid exchange and internal system flushing. The apparatus is designed to be mounted on a mobile cart and is capable of being located near an automatic transmission system to be cleaned. The apparatus comprises a machine module 10, a process control apparatus 12, and connecting wiring and fluid conduits.

The machine module 10 is connected to the external housing of an automatic transmission system 14 through a machine module outlet port 16 and a conduit 18. The machine module 10 is also connected to an external transmission cooler device 20 through a machine module inlet port 22 and a conduit 24.

The external transmission cooler device 20 usually comprises a network of fine fluid conduits with very good heat conducting capacity. The external transmission cooler device 20 exchanges heat between the hot transmission fluid coming from automatic transmission system 14 and the cooler medium surrounding these fine fluid conduits. The common heat exchange medium designed for the cooler device 20 is usually circulating liquid or passing air. In the case of circulating liquid, the cooler device 20 is completely submerged in the liquid, i.e, inside the radiator of a motor vehicle. In the case of air, the air is usually forced through the external portion of the fine fluid conduits of the cooler device 20 to maximize the rate of heat exchange.

The cooler device 20 is connected to the external housing of the automatic transmission system 14 by a conduit 26. As shown in FIG. 1, the hot transmission fluid flows out of the automatic transmission system 14 from an output port 28 and enters the cooler device 20 through an input port 30. The relatively cool transmission fluid exits the cooler device 20 through an output port 32 and enters the machine module 10 through the machine module inlet port 22. The transmission fluid then exits the machine module 10 through the machine module outlet port 16 and enters the automatic transmission system 14 through a inlet port 34.

The method shown in FIG. 1 for connecting the machine module 10, automatic transmission system 14 and the external transmission cooler device 20 is preferred over other arrangements due to the fact that contaminants flushed out from automatic transmission system 14 and the external transmission cooler device 20 can be captured by a filtration apparatus of the machine module 10 before returning to automatic transmission system 14, and because the hot transmission fluid exiting the automatic transmission system 14 will be cooled by external transmission cooler device 20 before reaching the machine module 10. In many cases, however, as when the vehicle is not moving or is not working hard, and the entire flushing, draining and refilling operation takes place in less than one hour, the heat generated may not be significant.

Figure 5:
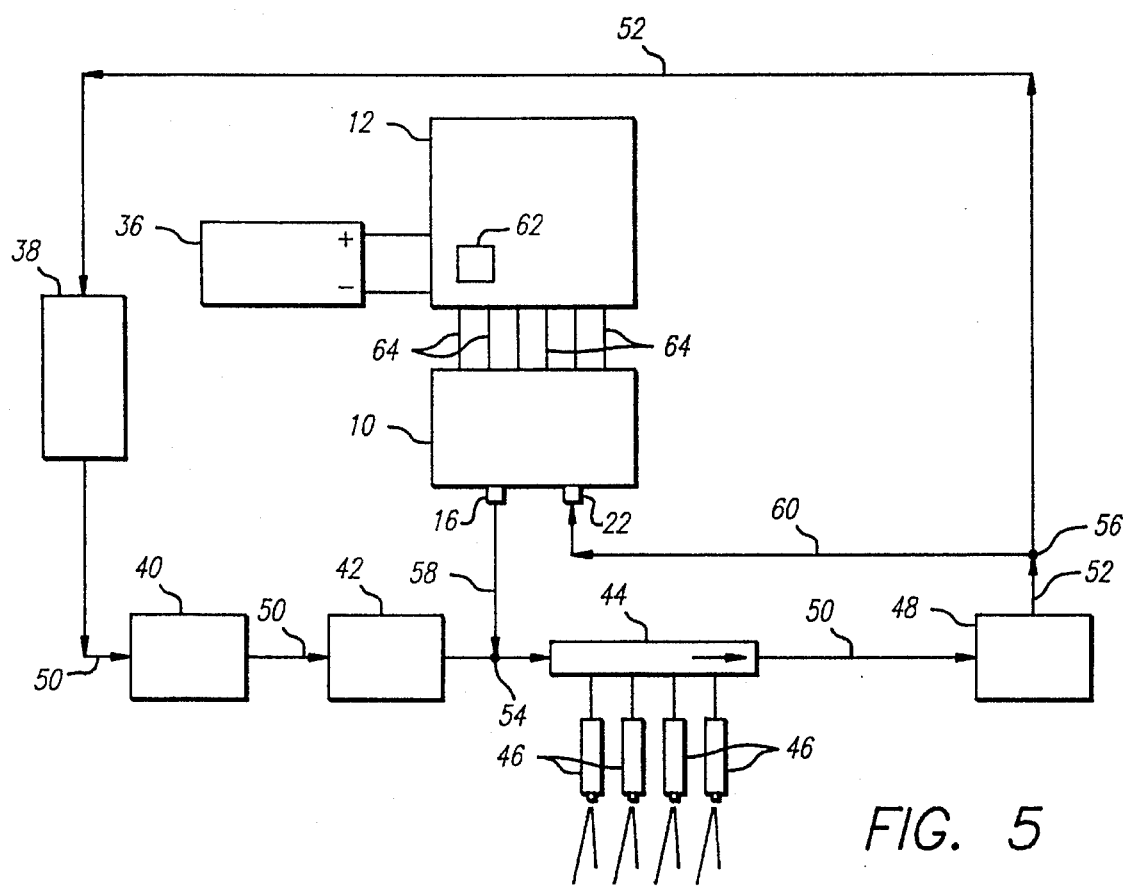
FIG. 5 is a block diagram of a system of the present invention, particularly illustrating the relationship and the preferred method of connection between the machine module, the process control apparatus, the power supply, and the fuel delivery system of an internal combustion engine.

Referring now to FIG. 5, the machine module 10, the process control apparatus 12, and a power supply 36 are shown in a preferred manner of connection to a fuel delivery system of an internal combustion engine. It will be understood, of course, that the fuel delivery system shown in FIG. 5 is only part of the fuel system of a typical internal combustion engine. Other fuel system components, such as intake valves, combustion chambers, pistons, spark plugs, etc., are well understood in the industry but are omitted here for clarity. These other fuel system components will be thoroughly cleaned under normal combustion procedures and therefore require the engine to be turned on during the fuel system flushing operations of the present invention.

The illustrated portions of the fuel delivery system include a fuel tank 38, a fuel pump 40, a fuel filter 42, a fuel distributing rail 44, fuel injectors 46, a fuel pressure regulator 48, a fuel delivery line 50 (the fuel line from the fuel tank 38 to the fuel pressure regulator 48), and a fuel return line 52 (the fuel line from the fuel pressure regulator 48 back to the fuel tank 38). Some of these components may not be present in many fuel systems, however. For instance, a carbureted fuel system does not have the fuel pressure regulator 48 and the fuel injectors 46. A carbureted system has a carburetor unit in place of the injectors 46 and more than likely does not have the fuel return line 52. A diesel fuel system, on the other hand, does not have the fuel pressure regulator 48, and has an additional fuel injection pump. Therefore, the connection method of FIG. 5, between the apparatus of the present invention and the fuel delivery system of the internal combustion engine, serves only to illustrate the general arrangement of parts and the fluid flow direction. Basically, if the engine is turned on, fuel is drawn from the fuel tank 38 to the fuel delivery line 50 by the fuel pump 40 and passes through the fuel filter 42 to the fuel distributing rail 44. Fuel is then injected into the engine for combustion through the fuel injectors 46. Excess fuel is returned to the fuel tank 38 by the fuel return line 52. The fuel pressure regulator 48 maintains constant fuel pressure by allowing excess fuel to pass through the fuel return line 52.

The machine module outlet port 16 and the machine module inlet port 22 of the machine module 10 are connected to the fuel delivery system at a connection point 54 in the fuel output line 50 and at a connection point 56 in the fuel return line 52 by fluid conduits 58 and 60, respectively. The connection point 54 in the fuel output line 50 is preferably located after the fuel filter 42 and before the fuel distributing rail 44 whenever possible. The fuel filter 42 is bypassed in this way to avoid flushing or dissolving the contaminants inside the fuel filter 42 so they are not carried into the rest of the fuel system by the specially formulated flushing solution and so the strength of the flushing solution is not diluted. For example, the diesel fuel system sometimes has a large quantity of fuel inside the fuel filter 42 which would otherwise dilute the flushing solution. After the machine module 10 is connected at the connection points 54 and 56, the fuel pump 40 is either disabled or the disconnected fuel lines 50 and 52 are connected together by adapter means at connection points 54 and 56 to create an independent fuel loop, bypassing the fuel distributing rail 44, the fuel injectors 46, and the fuel pressure regulator 48.

In the arrangement shown in FIG. 5, the machine module 10 effectively replaces the fuel tank 38, the fuel pump 40, and the fuel filter 42 of the fuel delivery system. For any fuel system not utilizing fuel return lines, such as most carbureted fuel systems, the machine module 10 is connected to the fuel system only at the connection point 54 of the fuel delivery line 50, prior to the carburetor unit. The elements associated with the fuel return line 52 are not used. The aforementioned arrangement and the advanced output fluid pressure and flow regulating capacity of the machine module 10 enable the system operator to duplicate any known type of fuel system pressure and flow requirements in any kind of internal combustion engine, such as gasoline, diesel or methanol fuel engines. Moreover, the apparatus and method of the present invention are designed to duplicate the normal operating conditions of the fuel system. Therefore, this type of cleaning process provided by the apparatus of the present invention thoroughly flushes away even hard-to-reach contaminants, combustion by-products and fuel deposits, as long as they are in full contact with a mixture of the fuel and flushing solution.

With reference to both FIG. 1 and FIG. 5, the process control apparatus 12 is supplied with electrical power from the power supply 36 to energize microprocessors, a process control timer, a process selection unit, pumps, valves, switches and sensors, and to perform all monitoring and control functions. The process control apparatus 12 contains a process control timer as well as control switches and indicators, including mechanical pressure meters, flow meters and manually operated valves related to or part of the machine module 10. The process control apparatus 12 also contains logic circuits for automatic process selections, such as a process selection unit 62, for controlling and monitoring of the functions and conditions of the apparatus. Electrical signal and power connections of the process control apparatus 12 are illustrated as interconnections 64 for powering and monitoring the machine module 10. The power supply 36 may be a direct current power supply, such as a battery of the motor vehicle serviced by the machine module 10.

Referring now specifically to FIG. 1, the primary functions of the machine module 10 in automatic transmission system flushing applications are: (1) pumping transmission fluid, (2) filtering and allowing visual inspection of transmission fluid and captured contaminants, (3) monitoring and regulating the pressure and flow of transmission fluid, (4) supplying fresh transmission fluid, and (5) receiving contaminated transmission fluid for proper disposal from the automatic transmission system 14 and the external transmission cooler device 20.

Figure 3:
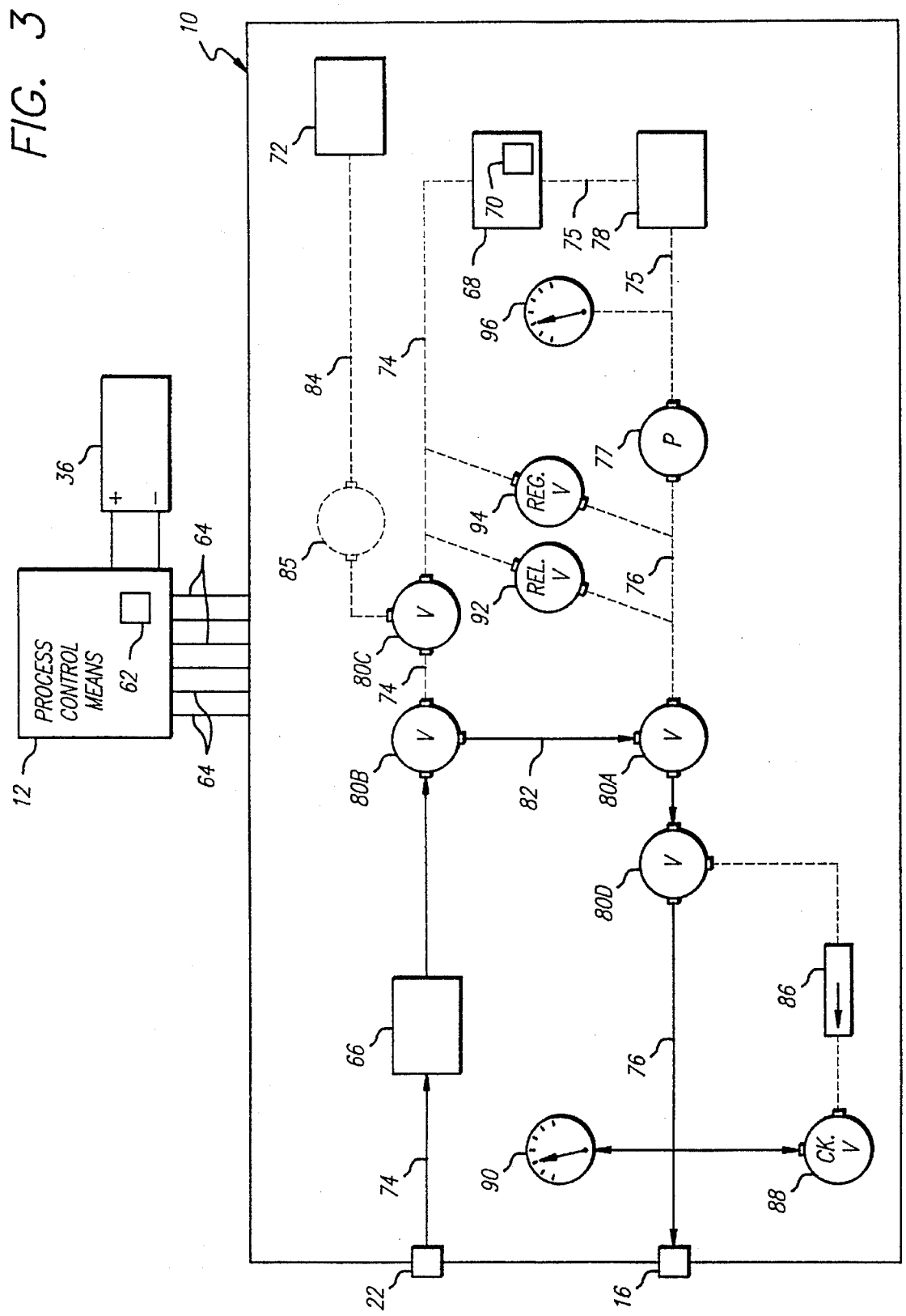
FIG. 3 is a schematic diagram of a machine module of the present invention showing the flow of fluid when the machine module operates in a Filtration/Flushing mode for service of an automatic transmission system.

In particular, when operating in the filtration/flushing mode, as illustrated in FIG. 3, the system of the present invention monitors normal operating conditions of the automatic transmission system with the engine turned on and the transmission gears shifted. The machine module 10 measures the pressure and flow rate of the transmission fluid in the conduits 24 and 18 while at the same time allowing visual inspection of the condition of the transmission fluid and the amount of contaminants captured within a see-through filter 66. This information is used to evaluate the cleanliness of the entire automatic transmission system, to identify the overall and individual operating conditions of the components inside the automatic transmission system 14, and to determine the effectiveness of the flushing operations. With this information, it is possible to determine whether further diagnostic, maintenance or cleaning operations should be pursued.

Figure 4:
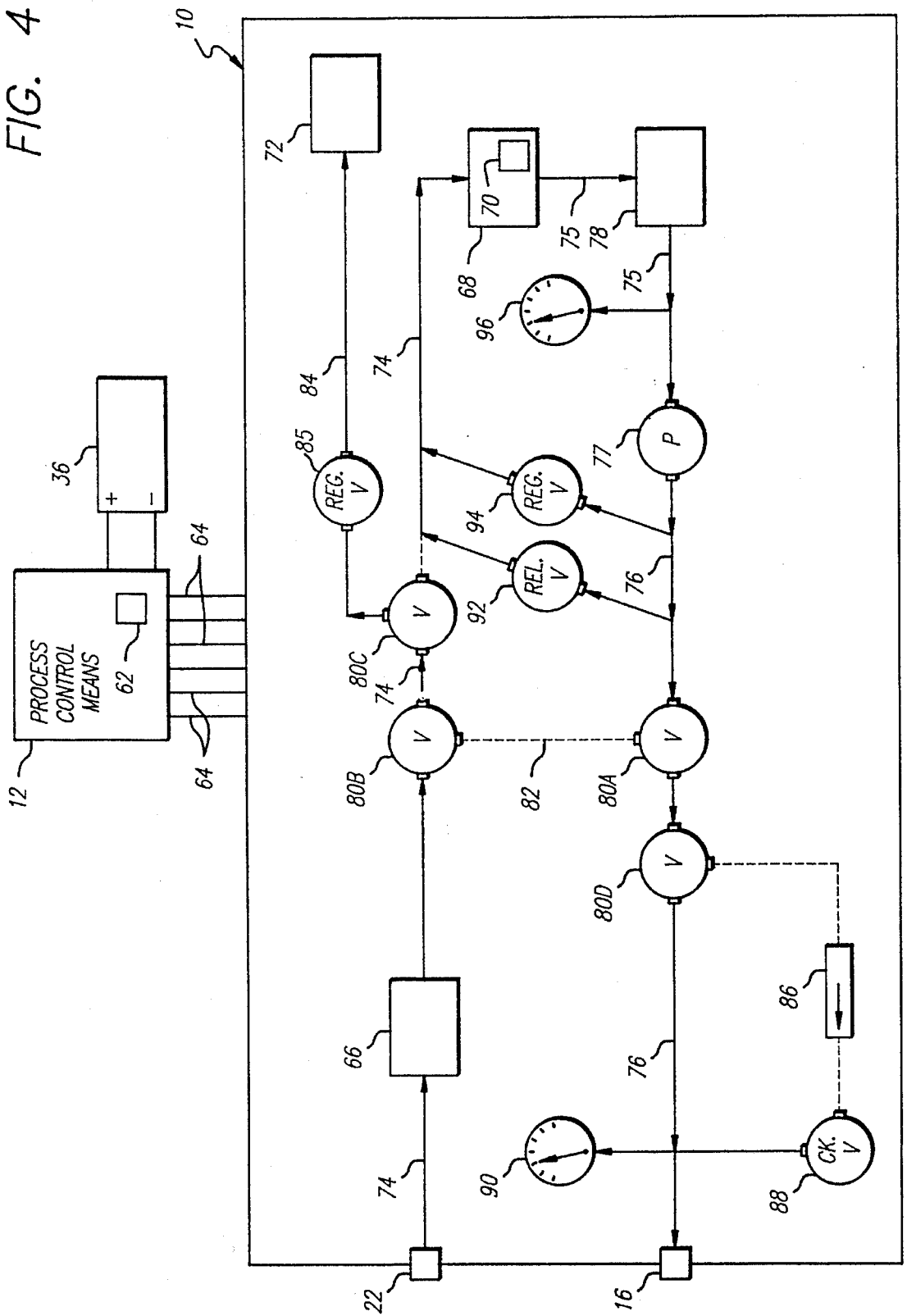
FIG. 4 is a schematic diagram of a machine module of the present invention showing the flow of fluid when the machine module operates in an Exchange/Refill mode for service of an automatic transmission system.

When operating in the exchange/refill mode, as illustrated in FIG. 4, the machine module 10 can be adjusted to supply fresh transmission fluid to the automatic transmission system 14 and the external transmission cooler device 20 at the proper pressure and flow rate, as noted during the filtration/flushing mode operation. Alternatively, the machine module can be preadjusted to deliver fluid at a pressure and flow rate specified by the manufacturer of the automatic transmission system, typically 30 to 45 GPH at 20 to 50 psi. Fluid pressures and flow rates exceeding manufacturer specifications can over-pressurize the system and cause damage to the automatic transmission system 14. Insufficient fluid pressure and flow can also damage the components of the automatic transmission system 14 by underlubricating the components and thereby causing wear and overheating of the automatic transmission system 14. In this mode, the machine module 10 also receives contaminated (used) transmission fluid from the automatic transmission system 14 and the external transmission cooler device 20 for proper storage and/or disposal. The flow of used fluid to the disposal site should be controlled when the machine module 10 is used with certain automatic transmission systems which might otherwise pump fluid out faster than new fluid can be pumped in. Under these circumstances, the flow of fluid out of the transmission system is preferably controlled by a flow regulating valve 85.

Figure 6:
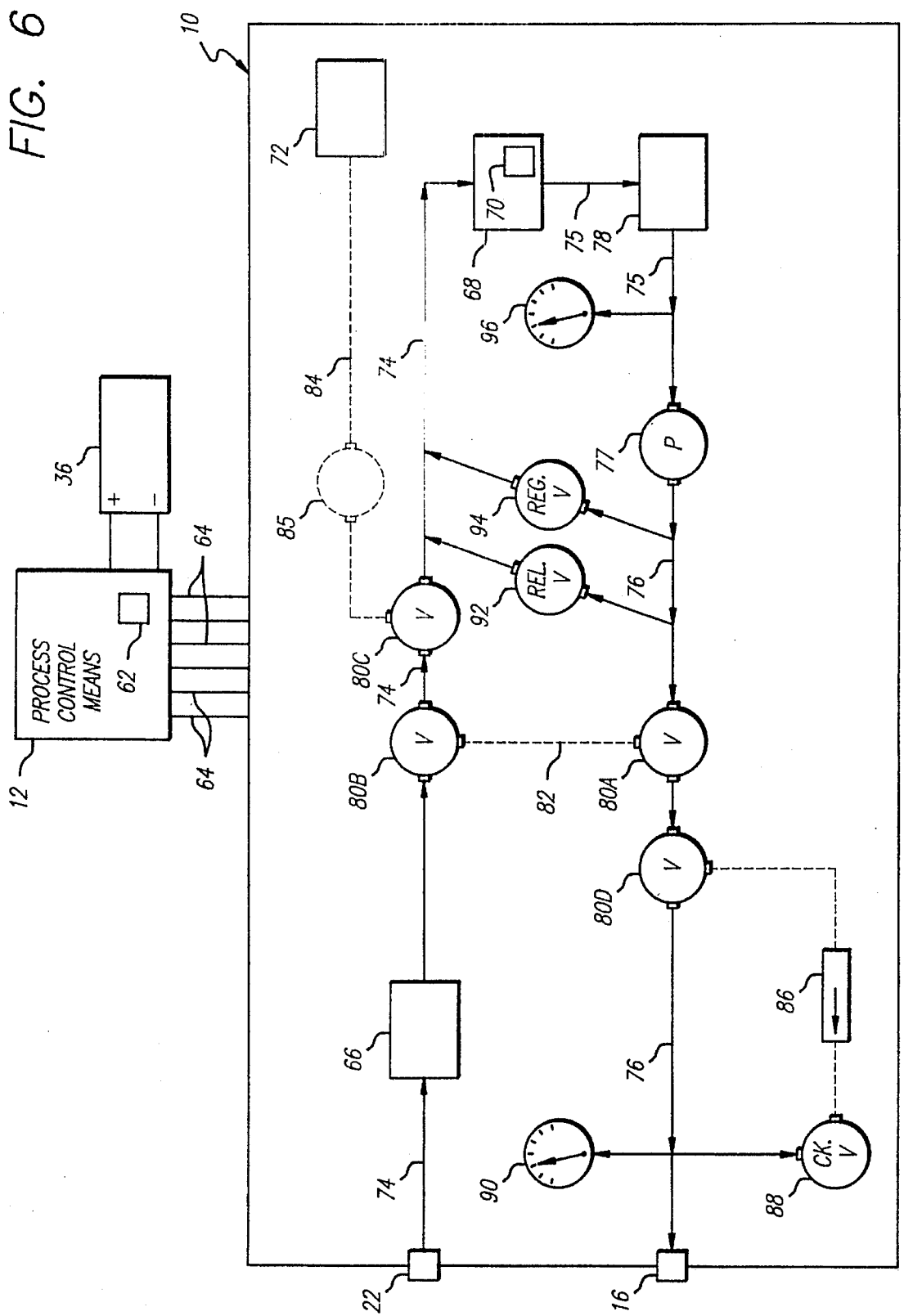
FIG. 6 is a schematic diagram of a machine module of the present invention showing the flow of fluid when the machine module operates in a Fuel System Flushing mode for service of an internal combustion engine.

With reference to FIGS. 5 and 6, the primary functions of the machine module 10 in fuel system flushing applications are: (1) pumping fuel, (2) filtering and allowing visual inspection of fuel system fluid and captured contaminants, (3) measuring and regulating the pressure and flow of fuel system fluid, and (4) supplying and receiving flushing solution mixture through the conduits 58 and 60.

On the other hand, when operating in its fuel system flushing mode, the machine module 10 monitors the pressure and flow rate of fluid in the conduit 58 and the fuel distributing rail 44. At the same time, it permits visual inspection of the condition of the fluid and captured contaminants within a see-through filter 66 (FIG. 6). This information is used to evaluate the cleanliness of the entire fuel system, to identify overall and individual operating conditions of the components inside the fuel system, and to determine the effectiveness of the flushing operations. With this information, it is possible to determine whether further diagnostic, maintenance or cleaning operations should be pursued.

Figure 2:
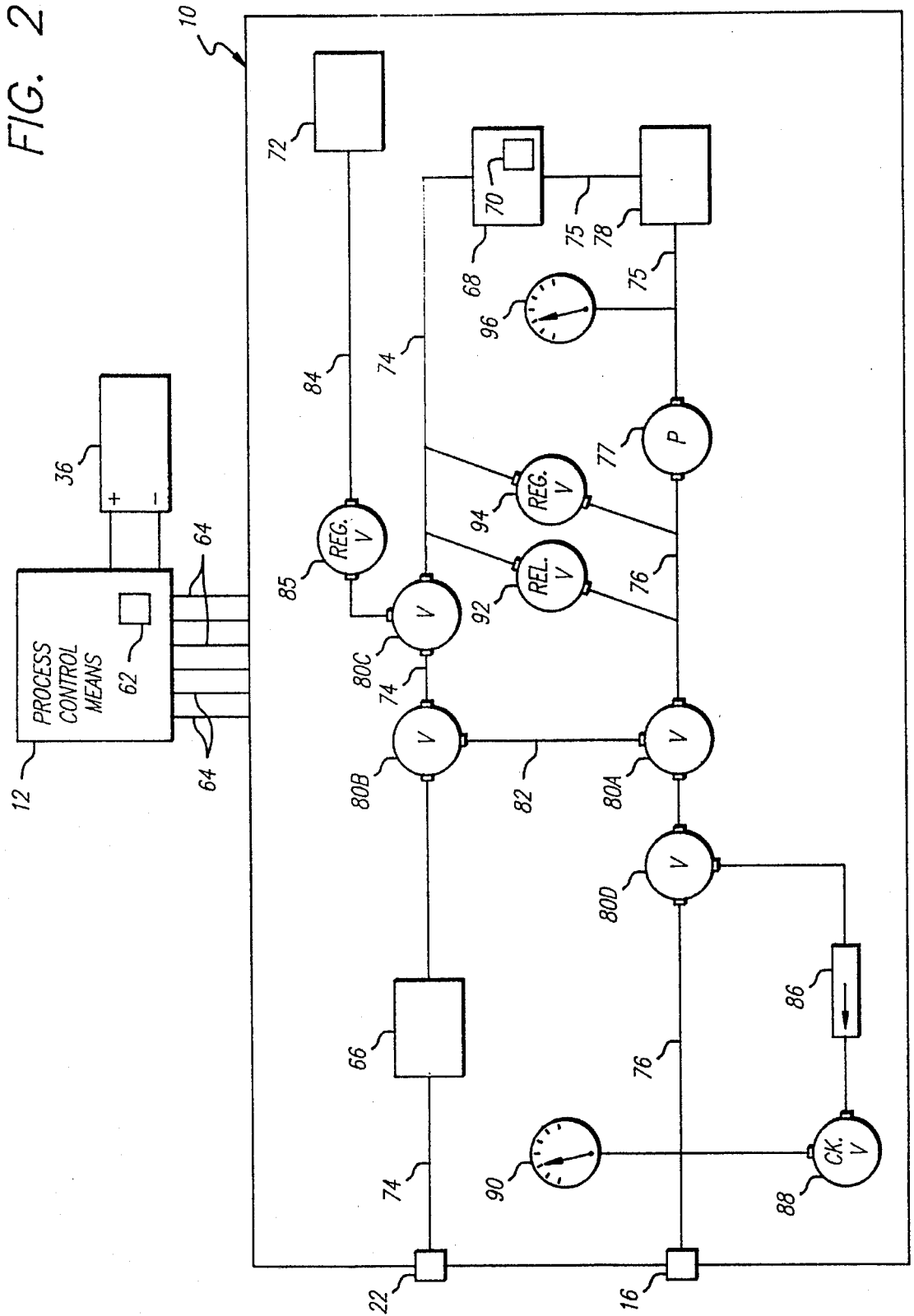
FIG. 2 is a simplified schematic diagram of the internal connections, components, and functions of a machine module of the present invention.

FIG. 2 illustrates a first fluid storage tank 68 which is used to store and supply fresh transmission fluid for automatic transmission system fluid exchange and internal system flushing operations. The first fluid storage tank 68 is also used to store and supply a mixture of fuel and flushing solution in the fuel system flushing operation. This tank may be equipped with a fluid level gauge (not shown), a cap to allow filling the tank manually (not shown), and a low fluid level sensor and switch arrangement 70 which is activated at a pre-set fluid level within the tank 68. In an automatic transmission system cleaning operation, the sensor and switch arrangement 70 causes the process selection unit 62 to switch the operating mode of the machine module 10 from the exchange/refill mode of FIG. 4 to the filtration/flushing mode of FIG. 3. The low fluid level sensor and switch arrangement 70 is deactivated in the fuel system flushing mode.

A second fluid storage tank 72 is a simple storage tank to accept waste fluid, i.e., used transmission fluid and flushing solution mixture, from the machine module 10 during automatic transmission system cleaning.

FIG. 2 is a simplified schematic diagram of the fluid circuits contained in and comprising the machine module 10. A number of pressure and flow sensors and indicators, as well as their electrical pickup points, are not shown. Also omitted for clarity are the necessary electrical connectors for operating valves and motors, as well as electrical monitoring lines.

The first fluid storage tank 68 communicates with the inlet port 22 along a return conduit 74 and communicates with the outlet port 16 along a transfer conduit 75 and a supply conduit 76. Fluid passes through the conduits 74, 75 and 76 under the influence of a high capacity fluid pump 77 which is located between the transfer conduit 75 and the supply conduit 76 and is preferably capable of producing pressures up to 130 psi at flow rates of 80 GPH or more. The see-through filter 66 is located within the return conduit 74 and a second filter 78 is provided in the transfer conduit 75 to extract contaminants from the circulating fluid.

Combination valves 80A, 80B, 80C and 80D are also provided in the system to selectively control the flow of fluid, with a bypass conduit 82 extending from the valve 80A in the supply conduit 76 to the valve 80B in the return conduit 74. The valve 80C is located in the return conduit 74 and communicates with the second fluid storage tank 72 through an exhaust or "waste" conduit 84.

A flow regulating valve 85 is preferably provided in the exhaust conduit 84 to permit the flow of used fluid from the automatic transmission system to be controlled while fluid is exchanged. Although this purpose can be served by either a flow regulator or a pressure regulator, and the present invention encompasses both types of devices, the class of useful devices is referred to herein generally as a "flow" regulating valve since regulation of the output flow of fluid from the transmission is achieved by all such devices. This function is not required for all automatic transmission systems, but is important in certain cases when the fluid pump of the transmission is powerful and the inlet passages of the transmission are relatively restricted. It is then possible for fluid to be pumped out of the transmission by the internal pump faster than fluid can be introduced by the module 10. When flow regulation is not required, the valve 85 is simply opened to allow used fluid to exit the transmission system at its own rate.

Other elements are also provided in the fluid circuit of the machine module 10 to determine the state of its operation and provide diagnostic analysis information on the user systems being cleaned. These include one or more flow meters 86, check valves 88 and pressures meters 90 associated with the valve 80D of the supply conduit 76, as well as a pressure regulating relief valve 92 and a fluid flow regulating valve 94 connected individually across the return conduit 74 and the supply conduit 76.

The following discussion describes the principal fluid circuits and operation of the machine module 10 in more detail.

Referring to FIG. 3 which illustrates the machine module 10 in the automatic transmission filtration/flushing mode, a mixture of flushing solution and used transmission fluid from the conduit 24 (FIG. 1) enters the machine module 10 through the inlet port 22 and passes through the see-through filter 66. The combination valve 80B, which is preferably a three way valve, is actuable to direct this flow of incoming fluid to the combination valve 80A, through the bypass conduit 82. The fluid then flows through the combination valve 80D, which is used as a bypass valve, and exits the machine module 10 through the outlet port 16 to the conduit 18 (FIG. 1). The pressure meter 90 provides feedback signals for monitoring fluid pressure at the outlet of the machine module 10. The combination valve 80D may be used to divert flow to the flow meter 86 for diagnostic analysis. The check valve 88 assures forward flow from flow meter 86 to the outlet port 16.

In the filtration/flushing mode of FIG. 3 for automatic transmission service, the fluid pump 77 is selectively deactivated by the process selection unit 62 to conserve electrical energy and to preserve the life span of the fluid pump 77. Therefore, in this mode of operation, the machine module 10 serves primarily as a convenient fluid passage for the used transmission fluid and flushing solution. However, the see-through filter 66 and diagnostic elements such as the pressure meter 90, the combination valve 80D, the flow meter 86, and the check valve 88 of the machine module 10, can be used to capture fluid contaminants and perform diagnostic functions. These functions include measurement of the fluid pressure and flow rate within the module, checking the condition of the fluid, and identifying captured contaminants. When the pre-programmed time for the filtration/flushing mode expires, the process selection unit 62 switches the machine module 10 to the exchange/refill mode of FIG. 4. With respect to these drawing figures, fluid does not usually pass along the paths indicated by dotted lines.

Referring to FIG. 4, which illustrates the machine module 10 in the automatic transmission exchange/refill mode, fresh transmission fluid is drawn from the first fluid storage tank 68 and along the transfer conduit 75 by the fluid pump 77. This fluid passes through the filter 78 and to the supply conduit 76. A pressure meter 96 communicates with the transfer conduit 75 on the suction side of the pump 77 to provide pressure level signals which sense any blockage of the second filter 78. The fluid pump 77 is preferably a high capacity magnetic coupling-type pump capable of providing the pressures and flow rates required. From the pump, the fluid flows through the combination valves 80A and 80D, and to the outlet port 16 and the conduit 18 (FIG. 1). Between the pump 77 and the bypass conduit 82, two parallel conduits provide for output fluid pressure and flow rate regulation by the flow regulating valve 94 and provide over-pressure control through the relief valve 92. Both of these valves return excess fluid to the return conduit 74 at a location downstream of the combination valve 80C, causing it to return to the first fluid storage tank 68. At the same time, used fluid from the automatic transmission system enters the module 10 along the return conduit 74 and is directed to the second fluid storage ("waste") tank 72 through the exhaust conduit 84. As mentioned above, the flow of fluid to the tank 72 can be regulated by the regulating valve 85, if desired.

At the beginning of the exchange/refill operation, by diverting the flow to the flow meter 86 and adjusting the flow regulating valve 94, the system operator can adjust the pressure and flow rate of the fresh transmission fluid being supplied to the transmission system through the outlet port 16 and the conduit 18 (FIG. 1). The pressure and the flow rate should closely match the pressure and flow rate observed during the filtration/flushing mode. Alternatively, the pressure and flow rate can be pre-adjusted to the transmission manufacturer's specifications before commencing the flushing operation. The over-pressure relief valve 92 provides an additional way to set the maximum safe operating pressure for the machine module 10 and the automatic transmission system being serviced. It is capable of being pre-set at the factory or field-set by the system operator.

As fresh fluid is supplied to the automatic transmission system through the outlet port 16, the mixture of used transmission fluid and flushing solution within the transmission is forced out along the conduit 24 (FIG. 1). It enters the machine module 10 through the inlet port 22 and passes through the see-through filter 66 and the combination valve 80B to the combination valve 80C. The used fluid is then directed by the combination valve 80C to the second fluid storage tank 72 for proper storage and disposal. Operation of the system in this way in the exchange/refill mode continues until: (1) the system operator manually turns it off, or (2) the process control apparatus 12 shuts it off.

The operator can terminate the exchange/refill mode manually when he observes from the see-through filter 66 that the mixture of used transmission fluid and flushing solution has been entirely replaced by fresh transmission fluid. This is indicated by a change in color of the fluid inside the see-through filter 66 from dark brown or dark red to the bright reddish color of fresh transmission fluid.

The process control apparatus 12 automatically terminates the exchange/refill mode if a process control timer (not shown) runs out, or if the low fluid level sensor and switch arrangement 70 in the first fluid storage tank 68 is activated by a fluid level below a preset value. In the latter case, a special alarm and warning light indicator (not shown) in the process control apparatus 12 alerts the operator. In either event, the process control apparatus 12 terminates the exchange/refill mode of the machine module 10. Whenever the exchange/refill mode is terminated, whether intentionally or accidentally, as for example by a power failure, the machine module 10 switches immediately back to the filtration/flushing mode to prevent damage to the automatic transmission system due to insufficient transmission fluid.

The purpose of the low fluid level sensor and switch arrangement 70 of the first fluid storage tank 68 is to enable the system operator to automate the process and thereby reduce the requirement for supervision once the flushing process begins. This automated process is discussed in greater detail below.

Figure 4A:
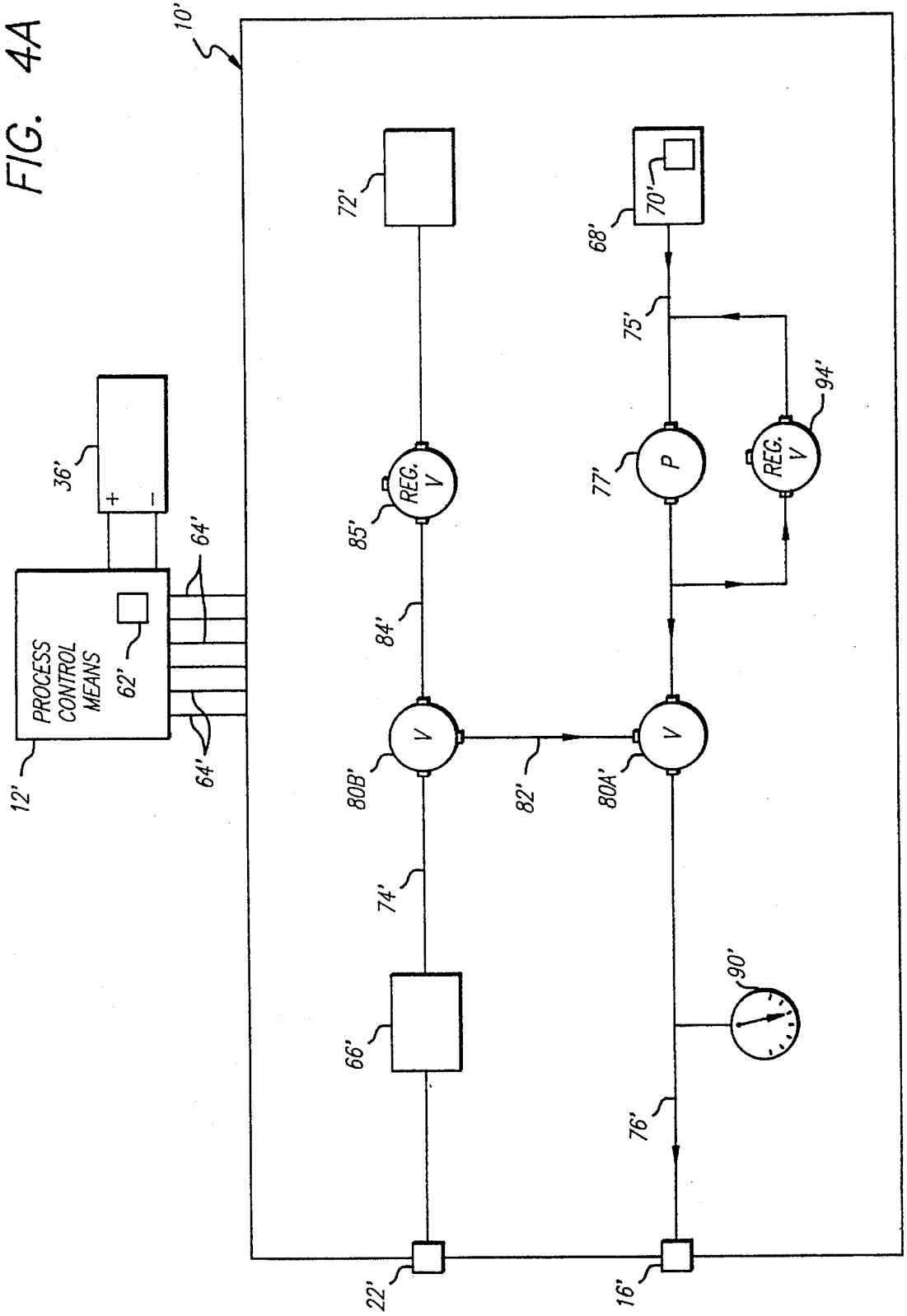
FIG. 4A is a schematic diagram of a machine module of the present invention similar to the module of FIG. 4, but with its fuel system capability deleted.

Although the machine module 10 of FIGS. 2–4 is a preferred form of the apparatus of the present invention when both automatic transmission systems and fuel delivery systems are to be serviced, the machine module 10 can take on a simpler construction when it is necessary only to service automatic transmission systems. A machine module constructed exclusively for this purpose is depicted in FIG. 4A, and is identified therein by the numeral 10'. The machine module 10' communicates with an automatic transmission system through an outlet port 16' and an inlet port 22' which may be identical to those described in conjunction with FIGS. 2–4, and has a first storage tank 68' containing new automatic transmission fluid and a second storage tank 72' for receiving used or "waste" automatic transmission fluid. The first storage tank 68' also has a low fluid level sensor and switch arrangement 70' similar to the arrangement 70 of FIGS. 2–4. A pump 77' draws fresh transmission fluid from the first storage tank 68' along a transfer conduit 75' and pumps it to the outlet port 16' through a combination valve 80A' and a supply conduit 76'. A regulating valve 94' is provided in parallel with the pump 77' to control the output pressure along the supply conduit 76', and a pressure meter 90' communicates with the supply conduit 76'.

Fluid from the automatic transmission system (not shown) enters the machine module 10' through the return port 22', where it passes through a see-through filter and/or a spectrometer 66' before reaching a combination valve 80B' in the return conduit 74'. In the exchange/refill mode of the machine module 10', the combination valve 80B' passes used transmission fluid from the return conduit 74' to the exhaust conduit 84'. Like the exhaust conduit 84 of the machine module 10, the exhaust conduit 84' contains a flow regulating valve 85' for controlling the discharge of used transmission fluid in some circumstances and terminates in a second ("waste") storage tank 72'. In the filtration/flushing mode, the combination valves 80B' and 80A' are switched to divert the flow of used fluid along the return conduit 74' to a bypass conduit 82' for passage of used fluid along the supply conduit 76' and back to the automatic transmission system.

The operation of the machine module 10' is the same as that of the machine module 10 of FIGS. 2–4 in the servicing of automatic transmission systems. As pointed out above, however, the machine module 10' is dedicated to the servicing of automatic transmission systems alone, and does not have the dual function of the machine module 10.

Referring now to the flow diagram of FIG. 6, which illustrates the machine module 10 in the fuel system flushing mode, a mixture of fuel and flushing solution fluid is drawn from the first fluid storage tank 68 by the fluid pump 77. This mixture passes through the second filter 78 in the transfer conduit 75. The pressure meter 96 on the suction side of the pump 77 provides pressure level signals to sense blockage of the second filter 78. The fluid pump 77 is preferably a high capacity magnetic coupling-type pump which produces the high pressure and flow rate required. From the pump, the fluid flows through the combination valves 80A and 80D to the supply port 16 and the conduit 58 (FIG. 5). Between the fluid pump 77 and the bypass conduit 82, two parallel conduits provide output fluid pressure and flow rate regulation by the flow regulating valve 94 and provide overpressure control through the relief valve 92. Both of these valves return excess fluid to the return conduit at a location downstream of the combination valve 80C, causing the fluid to return to the first fluid storage tank 68.

At the beginning of the fuel system flushing operation, the system operator may adjust the pressure and flow rate of the mixture of fuel and flushing solution supplied by the machine module 10 through the outlet port 16 to the supply conduit 58 (FIG. 5). If the external fuel pressure regulator 48 (FIG. 5) is present in the engine fuel system, the operator should adjust the output fluid flow rate to approximately 20 to 25 GPH by adjusting the flow regulating valve 94 and directing the fluid flow through the flow meter 86 using the combination valve SOD. The fluid pressure required by the fuel system being serviced (usually between 4 psi to 100 psi) is then regulated by the fuel pressure regulator 48 and the fuel pressure is shown on the pressure meter 90.

If the engine is started in the fuel system flushing mode, then fuel is sprayed into the combustion chambers by the fuel injectors 46 (FIG. 5). The pressure reading should then be about 3 , to 5 psi lower than the reading when the engine is off.

The pressure reading of the pressure meter 90 can be used to compare to the manufacturer's recommended setting. Any abnormal readings which persist after completion of the fuel system flushing indicate that other components of the engine's fuel system, such as the external fuel pressure regulator 48 or the fuel injectors 46 (FIG. 5), are defective. However, since about 90% of fuel system malfunctions are caused by internal contamination of fuel deposits, fuel additives, and combustion by-products, the foregoing fuel system flushing operation restores fuel systems to their normal operating condition in the vast majority of cases.

In very rare instances, a defective fuel pressure regulator 48 can cause the pressure of the fuel within the system to be so low that the engine cannot be started to achieve a complete fuel system flushing. Unfortunately, injector pintles, intake valves, spark plugs and combustion chambers cannot be thoroughly cleaned unless an engine is in its normal operating mode. In such cases, the operator can increase the fluid output to about 30 to 60 GPH, as needed to cause flow restriction by the fuel pressure regulator 48. The flow restriction developed on the fuel pressure regulator then causes enough back pressure for the engine to start.

In fuel systems where there is no fuel pressure regulator 48, the operator need not adjust the output fluid flow rate from the machine module 10 at the beginning of the flushing operation. Instead, the output fluid pressure should be adjusted to the manufacturer's recommended setting by watching the pressure meter 90 for the pressure reading and adjusting the flow regulating valve 94 to relieve excess pressure in the machine module 10 and the fuel system being serviced. In this instance, the flow regulating valve 94 acts like a pressure control valve by allowing excess fluid to return back to the first fluid storage tank 68.

In the extremely rare instance in which exact output fluid pressure and flow rate are required during the flushing operation, the flow meter 86 should be activated and a second flow regulating valve (not shown) should be installed in the conduit 58. By adjusting this second flow regulating valve and the regulating valve 94 of the machine module 10, the exact fluid output flow rate and pressure can be easily achieved. The over-pressure relief valve 92 provides an additional mechanism to set the maximum safe operating pressure for machine module 10 and the user fuel system being serviced. It is capable of being pre-set at the factory or field-set by the system operator.

The mixture of excess fuel and flushing solution from the fuel system being serviced enters the machine module 10 from the conduit 60 through the inlet port 22 and passes through the see-through filter 66 to the combination valve 80B. The fluid is then directed to the combination valve 80C and back to the first fluid storage tank 68 for continued flushing. Of course, the above discussion of the fluid return circuit is not applicable to systems in which no return line is used. The operation of the fuel system flushing mode continues until the operator manually turns it off, or until the process control timer of the process control apparatus 12 shuts it off. The low fluid level sensor and switch arrangement 70 of the first fluid storage tank 68 is deactivated in the fuel system flushing mode.

In order to use a single machine module 10 for different applications, such as automatic transmission service and servicing the fuel system of an internal combustion engine, the system operator must flush the machine module 10 in a closed cycle each time the use is changed to clean and remove all residue of the previous fluid. This is also necessary when using the machine module 10 to service engines burning incompatible fuels, such as gasoline and diesel. Finally, the size and capacity of the apparatus of the present invention is determined by its intended application. It can be sized to be mobile and easily moved, or it can be sized for a large installation to service high capacity, stationary systems.

Figure 7:
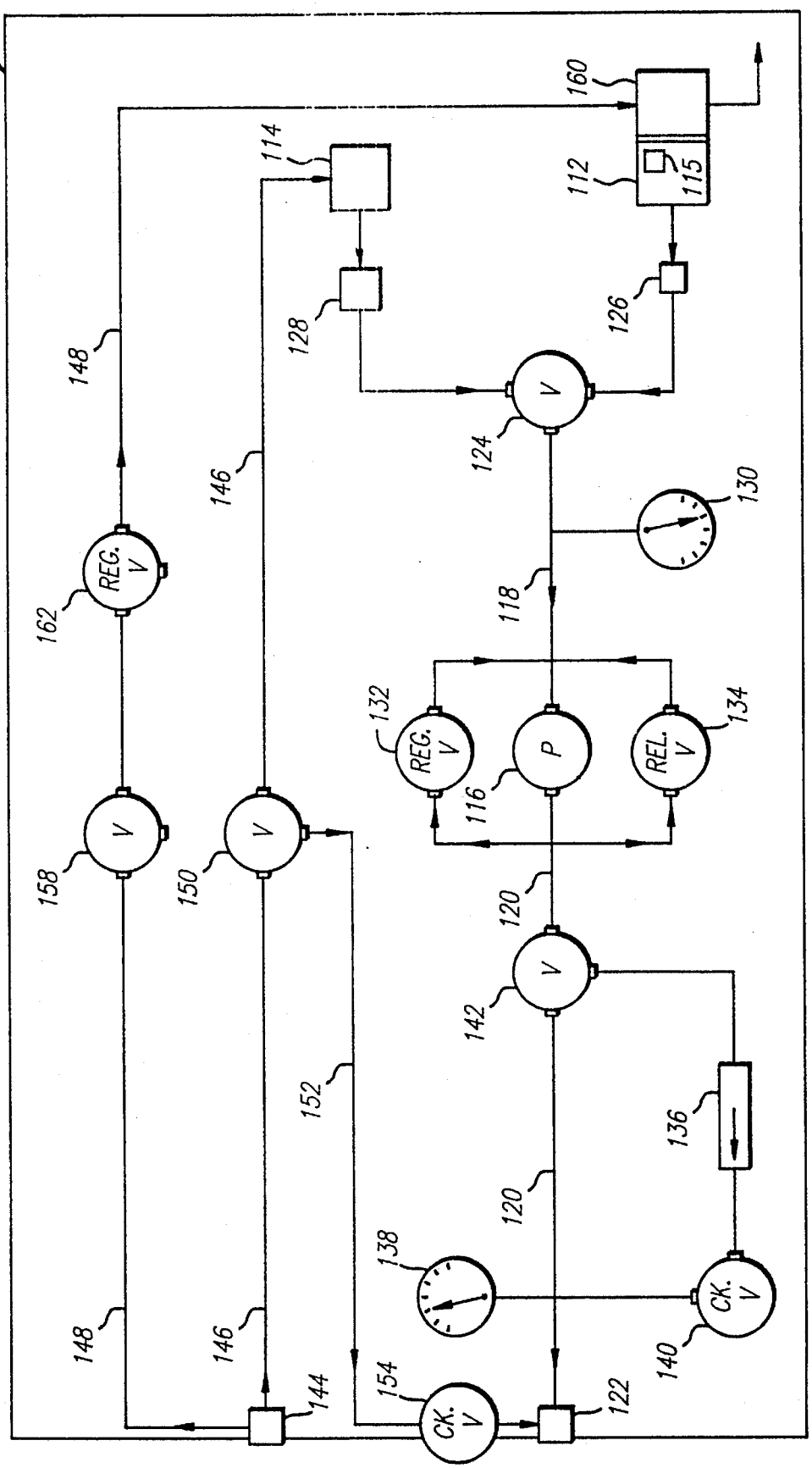
FIG. 7 is a schematic diagram of a machine module constructed according to another embodiment of the present invention wherein the module can be very readily flushed, permitting it to be quickly and easily switched between automatic transmission and fuel system service.
Figure 8:
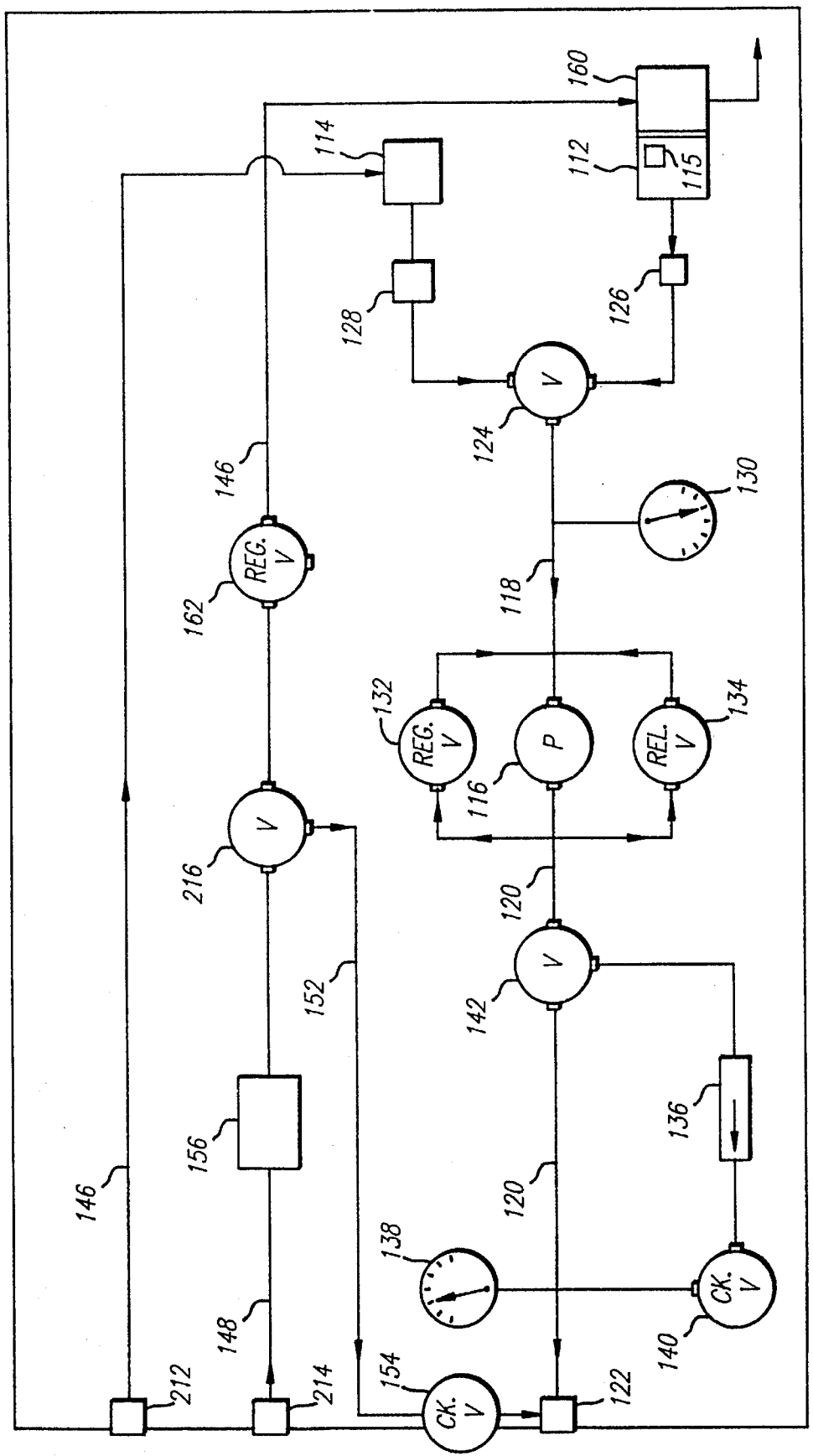
FIG. 8 is a schematic diagram of a machine module similar to that of FIG. 7 wherein separate inlet ports are provided for connecting to automatic transmission systems and fuel systems of internal combustion engines.

Two alternative apparatuses of the present invention, which are specifically designed to be readily flushed of residual fluids between uses, are illustrated in FIGS. 7 and 8. For simplicity, these apparatuses are shown without process control circuitry similar to the element 12 of FIGS. 1-6; however, it will be understood that similar circuitry will nevertheless be provided in many circumstances.

Referring first to FIG. 7, a machine module 110 has separate storage tanks for holding fluids to treat automatic transmission systems and fuel systems, and is actuable automatically between its various modes of operation. Specifically, the machine module 110 has a first storage tank 112 for holding a first fluid to treat an automatic transmission system and a second storage tank 114 for holding a second fluid to treat a fuel system. The storage tank 112 also has a low fluid level sensor and switch arrangement 115 which is similar to the arrangement 70 and 70' described above. The contents of the storage tanks are selectively drawn by a high capacity pump 116 along a transfer conduit 118 for delivery via a supply conduit 120 to an outlet port 122 connected to an automatic transmission system or a fuel system (not shown). Selection between the storage tanks 112 and 114 is made by a combination valve 124 in the transfer conduit 118. The combination valve 124 is actuable to draw a first automatic transmission system fluid from the first storage tank 112 through a suitable strainer 126, or to draw a fuel system fluid from the second storage tank 114 through a filter 128. Throughout this process, the pressure within the transfer conduit 118 is monitored by a pressure gauge 130.

The fluid flow and pressure from the pump 116 are controlled by a flow regulating valve 132 and a pressure relief valve 134, both of which are connected in parallel with the pump. These valves are preferably adjustable to control the flow rate and pressure along the supply conduit 120 to match the normal operating requirements of the automatic transmission system or the fuel system (not shown) with which machine module 110 is used. These conditions are monitored during the operation of the machine module 110 by a flow meter 136 and a pressure gauge 138 of the supply conduit. The flow meter 136 has a check valve 140 and is connected in parallel with a portion of the supply conduit 120 for measuring the total supply flow when a valve 142 is actuated to divert fluid flow through the flow meter 136.

Fluid is received by the machine module 110 through an inlet port 144 from the automatic transmission system or fuel system being treated, and passes from the inlet port to a return conduit 146 or a waste conduit 148. The return conduit 146 has a combination return valve 150 operable selectively to prevent fluid flow along the return conduit 146, pass fluid back to the second storage tank 114, or return fluid to the outlet port 122 through a bypass conduit 152 and a check valve 154. A see-through filter or fluid spectrometer (not shown) is preferably also provided in the conduit 28 (FIG. 1) upstream of the return port 144 to detect the level of fluid contamination within the conduit for purposes of process control. The waste conduit 148, on the other hand, contains a waste valve 158 for selectively passing fluid from the inlet port 144 to a third waste tank 160 along the waste conduit 148. In a preferred embodiment, a flow regulating valve 162 is also provided within the waste conduit 148 to regulate the rate at which fluid is allowed to flow to the waste tank 160. This valve may be identical to the flow regulating valve 85 of FIG. 2. Thus, the flow regulating valve 162 provides a means for limiting the flow of waste fluid out of the system being serviced and thereby prevents a low fluid condition within the system. In a preferred embodiment, a simple needle valve can serve as both the waste valve 158 and the flow regulating valve 162.

The machine module 110 functions in a manner similar to the machine module 10 of FIGS. 1-6, except that separate storage tanks are provided for treating automatic transmission systems and fuel systems. This construction, along with valves in all branches of the module, permits the module to be used alternately for automatic transmission system cleaning and fuel system cleaning without the need to disconnect and separately flush all of the tanks and lines within the system. Although some of the lines must be flushed when the machine module 110 is switched between its automatic transmission function and its fuel system function, the flushing sequence is much simpler than that of the machine module 10.

The construction of the machine module 110 also eliminates the need for a valve in the supply conduit 120 by terminating the bypass conduit 152 at or near the outlet port 122. In this configuration, the check valve 154, the check valve 140 and the diverter valve 142 serve the purpose of the combination valve 80A of machine module 10.

It will noted in connection with the machine module 110 that the first storage tank 112 and the third waste tank 160 are shown side-by-side so that the flow of fluid through the transmission system being cleaned (not shown) can be monitored by visually comparing the levels of fluid in the tanks. To facilitate this, the tanks 112 and 160 are preferably of the same capacity (for example, 4.5 gallons each) and the same dimensions, and they may be provided with transparent side panels.

With reference now to FIG. 8, a machine module 210 is similar in most ways to the machine module 110 but has a second inlet port specifically for receiving used transmission fluid from an automatic transmission system being serviced. Instead of a single inlet port connected to a return conduit 146 and a waste conduit 148, the machine module 210 has a first inlet port 212 leading to a second storage tank 114 by a way of a return conduit 146, and has a second inlet port 214 leading to a waste tank 160 through a waste conduit 148 and a combination waste valve 216. While the return conduit 146 leads directly from the first inlet 212 to the storage tank 114, the waste conduit 148 is controlled by the combination waste valve 216 and a flow regulating valve 162. Thus, the combination waste valve 216 can either pass fluid from the second inlet port 214 to the waste tank 160 or, in the alternative, divert the flow of used transmission fluid through a bypass conduit 152 and a check valve 154 to an outlet port 122. The combination waste valve 216 therefore functions to switch the machine module 210 in the automatic transmission cleaning process between the filtration/flushing mode and the exchange/refill mode. In the filtration/flushing mode, used transmission fluid enters the second inlet port 214, passes through the see-through filter or spectrometer 156 and is diverting by the combination waste valve 216 along the bypass conduit 152 for return to the automatic transmission system being cleaned. In the exchange/refill mode, the combination waste valve 216 passes used transmission fluid along the waste conduit 148 to the waste tank 160 for ultimate disposal. In this mode, the regulating valve 162 can be adjusted to limit the flow of used transmission fluid to the waste tank 160 and thereby prevent the amount of fluid within the transmission system from dropping below that required for normal operation.

The structure of the machine module 210 is particularly well-suited for use alternately to service automatic transmission systems and fuel systems because its return and waste conduits are entirely separate. All that is required when switching between automatic transmission and fuel system use with the module 10 is pumping of the desired fluid through the transfer conduit 118 and a supply conduit 120 to expel any undesired fluid in this portion of the module 210. This can be done before connecting the outlet port 122 to the system to be cleaned.

In the fluid circuitry described above, it should be understood that all of the illustrated valves can be either manually operated valves, electrically operated solenoid valves, or hydraulically or pneumatically operated valves. These valves can be controlled either by the process control apparatus 12 or the machine module 10. In addition, the illustrated valve structures can take the form of individual combination valves or, in the alternative, a number of simple valves combined together to perform the more complex functions discussed. Each valve is therefore best described generally as a "valve apparatus" in the context of the present invention.

DESCRIPTION OF PREFERRED METHODS OF UTILIZATION

The preferred methods of utilizing the system of the present invention to exchange used automatic transmission fluid with fresh transmission fluid, and flush automatic transmission systems of motor vehicles or other similar machines are set out below.

Procedure A

This procedure is applicable to automatic transmission systems that have never been flushed according to the method of the present invention, or in situations where nothing less than essentially 100% fluid exchange is satisfactory.

(a) As described in FIG. 1, place an automatic transmission flushing machine module (10, 10', 110 or 210) in series with the fluid transfer conduits 24 and 18.

(b) As described in conjunction with FIG. 3, establish stable fluid flow conditions in the fluid transfer conduit by operating the automatic transmission system normally with the engine running. This can be accomplished with the engine running and the car wheels stationary or, in one specific embodiment, with the drive wheels free to turn. In the latter case, the car can either be positioned on a dynamometer which permits the wheels to turn or be raised until its drive wheels are out of contact with the ground.

(c) As described in conjunction with FIG. 3, measure the pressure and the rate of fluid flow in the fluid transfer conduits 24 and 18. In the embodiments disclosed, this is accomplished on the supply side with the pressure gauges 90, 90' and 138 and the flow meters 86 and 136. On the return side, similar measurement devices can be provided within the machine module or outside the module in the conduit 24 itself.

(d) Shift through all transmission gear positions while stopping at each position (D, OD, L1, L2, R, N, etc.) for at least two minutes to allow complete flushing and filtering of contaminants from the automatic transmission system 14 and the external transmission cooler device 20. Allow at least fifteen minutes of combined flushing and filtering in all transmission gear positions of the automatic transmission system.

(e) As described in conjunction with FIG. 4, direct fresh transmission fluid into the automatic transmission system to replace the mixture of used transmission fluid and flushing solution in the current gear position. During this step, the mixture of used fluid and flushing solution is collected in the second fluid tank 72 of FIG. 2 or the waste tank 160 of FIGS. 7 and 8.

(f) When replacing used transmission fluid and flushing solution, adjust the output pressure and flow rate of the fresh transmission fluid to the level noted in step (c). Make any necessary adjustments to the waste ATF pressure/flow regulating valve (85 or 162) to establish equal fluid input and output from the automatic transmission system.

(g) Repeat step (e) for all transmission gear positions.

(h) Reconnect the external transmission cooler device 20 to the automatic transmission system 14.

(i) Check transmission fluid level and add additional fluid, as needed.

(j) Just before or after the machine module (10, 10', 110 or 210) of the present invention is connected to the automatic transmission system 14 and external transmission cooler device 20, a flushing solution is introduced into the automatic transmission system for stripping and dissolving any contaminants from the internal passages and chambers of the entire automatic transmission system. At the same time, a suitable amount of fresh transmission fluid is stored in the first fluid storage tank 68 of FIG. 2 or the fluid storage tank 112 of FIGS. 7 and 8.

Naturally, the sequence described above could take place in a different order, or some of the steps could be omitted or varied. However, a full flushing operation, as described above, is recommended for maximum effectiveness.

Procedure B

This procedure is applicable to an automatic transmission system regularly flushed by the method of the present invention in which contamination of the transmission system is not severe. The procedure described herein will thoroughly flush about 85% of the automatic transmission system and replace about 90% of the used transmission fluid.

(a) As shown in FIG. 1, place an automatic transmission flushing machine module (10, 10', 110 or 210) in series with the fluid transfer conduits 24 and 18.

(b) As described in conjunction with FIG. 3, establish stable fluid flow conditions in the fluid transfer conduit by operating the automatic transmission system normally with the engine running and measure the pressure and the rate of fluid flow in the fluid transfer conduits 24 and 18.

(c) After at least fifteen minutes of flushing and filtering in one transmission gear position, as described in conjunction with FIG. 3, introduce fresh transmission fluid into the automatic transmission system to replace the mixture of used transmission fluid and flushing solution as described in conjunction with FIG. 4 for the current transmission gear position. During this step, the mixture of used fluid and flushing solution is collected in the second fluid tank 72 of FIG. 2 or the waste tank 160 of FIGS. 7 and 8. At the beginning of the replacement step, however, the output pressure and flow rate of fresh transmission fluid are adjusted to the level noted in step (b) above. This is accomplished with the pressure relief valve 92 and the flow regulating valve 94 of FIG. 2, or the pressure relief valve 134 and the flow regulating valve 132 of FIGS. 7 and 8. Equal fluid input and output relative to the automatic transmission system is then achieved by adjustment of the waste pressure/flow regulating valves 85 (FIG. 2) or 162 (FIGS. 7 and 8), if required.

(d) Reconnect the external transmission cooler device 20 to the automatic transmission system 14.

(e) Check transmission fluid level and add additional fluid, as needed.

(f) Just before or after the machine module (10, 10', 110 or 210) of the present invention is connected to the automatic transmission system 14 and the external transmission cooler device 20, a flushing solution is introduced into the automatic transmission system for stripping and dissolving any contaminants from the internal passages and chambers of the entire automatic transmission system.

(g) Just before or after the machine module 10 of the present invention is connected to the automatic transmission system 14 and the external transmission cooler device 20, the process selection unit 62 of the present invention is programmed to allow about 15 to 20 minutes for the filtration/flushing mode, and fresh transmission fluid intended for the transmission system being serviced is stored in first fluid storage tank 68 of FIG. 2 or the storage tank 112 of FIGS. 7 and 8. This tank then preferably contains a quantity of fresh transmission fluid slightly greater than the total fluid capacity specified by the manufacturer of the transmission, plus enough fresh fluid so that the low fluid level sensor and switch arrangement 70 or 115 will not be activated. In this instance, once the operator establishes equal input and output pressures and flow rates relative to the automatic transmission system, there is no need to supervise the refilling operation until the entire process is completed. At that time the process selection unit 62 of the present invention alerts the operator through a special alarm signal, and the low fluid level sensor and switch arrangement 70 of the first fluid storage tank 68 switches the operation of the machine module 10 back to the filtration/flushing mode. Therefore, after the process is completed, the operator has plenty of time to discontinue the process without risk of damaging the automatic transmission system.

Naturally, the sequence described above could take place in a different order and some of the steps can be omitted or varied. However, a full flushing operation of the type previously described is recommended for maximum effectiveness.

The most effective fuel system and transmission flushing solution known to the applicant for use in conjunction with the present invention is sold under the trade name POWER CLEAN 2000, manufactured by Power Clean 2000, Inc. of California.

The advantages of the proposed apparatus and method over existing apparatus and cleaning methods include an inherent efficiency in time and labor in replacing 100% of used automatic transmission fluid with fresh transmission fluid, and in flushing an entire automatic transmission system, restoring it to an almost new condition, which would otherwise be impossible without mechanically dismantling the entire system for complete fluid exchange and thorough cleaning. Further advantages include: (1) the ability to diagnose the operating condition of a contaminated automatic transmission system, before, during and after the application of the cleaning mode of the apparatus; (2) the usage of only one apparatus as described instead of another different set of cleaning equipment for cleaning different types of fuel systems of internal combustion engines; and (3) and the ability to diagnose operating conditions of contaminated fuel systems, before, during and after the application of the cleaning mode of the apparatus.

From the above description, it is apparent that the preferred embodiment and the preferred method of utilizing the present invention achieve the objects of the present invention. Alternative embodiments, methods of utilization, and various modifications of the preferred embodiments, and methods of utilization depicted, will be apparent from the forgoing description to those skilled in the art. The appended claims are, of course, not limited to the embodiments described herein, but rather are applicable to all variations and adaptations falling with the scope and spirit of the present invention.

What is claimed is:

1. Apparatus for internally flushing and exchanging fluid within an automatic transmission system while the automatic transmission system operates, comprising:

a storage tank for holding fluid to treat said automatic transmission system;

a transfer conduit connected to a pump for delivering said fluid to said automatic transmission system;

a supply conduit leading from said pump to an outlet port, said outlet port adapted to be connected to a conduit which leads to said automatic transmission system;

a return conduit leading from an inlet port to a waste conduit, said inlet port adapted to be connected to a conduit leading from said automatic transmission system and said waste conduit leading to a location for disposal of waste fluid passing from said automatic transmission system while it operates;

a bypass conduit connected between a first valve apparatus located in said supply conduit and a second valve apparatus located in said return conduit;

said first valve apparatus selectively directing flow to said outlet port from one of said bypass conduit and said pump; and said second valve apparatus for selectively directing flow from said inlet port to one of said bypass conduit and said waste conduit.

2. The internal flushing and fluid exchange apparatus of claim 1 further comprising:

flow regulating apparatus in one of said return conduit and said waste conduit.

3. The internal flushing and fluid exchange apparatus of claim 2 wherein:

said flow regulating apparatus comprises at least one flow regulating valve.

4. The internal flushing and fluid exchange apparatus of claim 1 further comprising:

a pressure meter adapted to measure the pressure in the transfer conduit.

5. The internal flushing and fluid exchange apparatus of claim 1 further comprising:

a filter in a transparent housing located within said return conduit or said conduit leading from said automatic transmission system.

6. The internal flushing and fluid exchange apparatus of claim 1 further comprising:

a fluid level sensor in said storage tank.

7. The internal flushing and fluid exchange apparatus of claim 6 further comprising:

a process control apparatus responsive to said fluid level sensor for controlling said pump and valves and monitoring the status of said internal flushing and fluid exchange apparatus.

8. The internal flushing and fluid exchange apparatus of claim 1 further comprising:

pressure regulating apparatus within said supply conduit to regulate the pressure of fluid delivered to said system.

9. The internal flushing and fluid exchange apparatus of claim 8 wherein:

said pressure regulating apparatus is adjustable.

10. The internal flushing and fluid exchange apparatus of claim 1 further comprising:

flow regulating apparatus within said supply conduit to regulate the flow of fluid to said system.

11. The internal flushing and fluid exchange apparatus of claim 10 wherein:

said flow regulating apparatus is adjustable.

* * * * *